United States Patent [19]

Yamasaki et al.

[11] Patent Number: 5,282,518
[45] Date of Patent: Feb. 1, 1994

[54] VEHICULAR FOUR WHEEL DRIVE TRAIN

[75] Inventors: Saburou Yamasaki, Isehara; Tomoyuki Hara, Hadano, both of Japan

[73] Assignee: Nissan Motor Co., Ltd., Yokohama, Japan

[21] Appl. No.: 9,347

[22] Filed: Jan. 26, 1993

Related U.S. Application Data

[63] Continuation of Ser. No. 652,078, Feb. 8, 1991, abandoned.

[30] Foreign Application Priority Data

Feb. 14, 1990 [JP] Japan .................................. 2-33302

[51] Int. Cl.⁵ .................................................. B60K 17/34
[52] U.S. Cl. .................................. 180/233; 180/247; 180/248; 180/249
[58] Field of Search ............... 180/233, 247, 248, 249, 180/374, 375, 380

[56] References Cited

U.S. PATENT DOCUMENTS

| | | | |
|---|---|---|---|
| 3,828,877 | 8/1974 | Fogelberg | 180/249 |
| 3,889,771 | 6/1975 | Kronogard | 180/248 |
| 3,998,290 | 12/1976 | Sivers et al. | 180/380 |
| 4,605,084 | 8/1986 | Haynes et al. | 180/233 |
| 4,628,754 | 12/1986 | Ideta et al. | 74/467 |
| 4,862,769 | 9/1989 | Koga et al. | 180/249 |

FOREIGN PATENT DOCUMENTS

| | | | |
|---|---|---|---|
| 574413 | 4/1933 | Fed. Rep. of Germany . | |
| 948366 | 8/1956 | Fed. Rep. of Germany | 180/380 |
| 835082 | 12/1938 | France . | |
| 1424799 | 12/1965 | France . | |
| 2253645 | 12/1974 | France . | |
| 114726 | 7/1982 | Japan | 180/233 |
| 61-157437 | 7/1986 | Japan . | |
| 62-247924 | 10/1987 | Japan . | |
| 97432 | 4/1988 | Japan | 180/233 |
| 1-64630 | 6/1989 | Japan | 180/233 |
| 493417 | 10/1938 | United Kingdom | 180/248 |
| 1102901 | 2/1968 | United Kingdom | 180/248 |
| 2189861 | 11/1987 | United Kingdom . | |

OTHER PUBLICATIONS

Manual Porsche 928, vol. VII, 1983 39-101.

*Primary Examiner*—Mitchell J. Hill
*Attorney, Agent, or Firm*—Foley & Lardner

[57] ABSTRACT

An engine and a first final drive are disposed proximate a first set of road wheels, while the transmission and a second final drive are disposed proximate the second set of road wheels. A torque tube which operatively interconnects the engine containing section with the section in which the transmission is disposed, houses a first propeller shaft which transmits engine torque to the transmission, and a hollow second propeller shaft which is disposed coaxially about the first one, and which transmits torque back from the transmission to the engine containing section for application to the first set of road wheels.

9 Claims, 3 Drawing Sheets

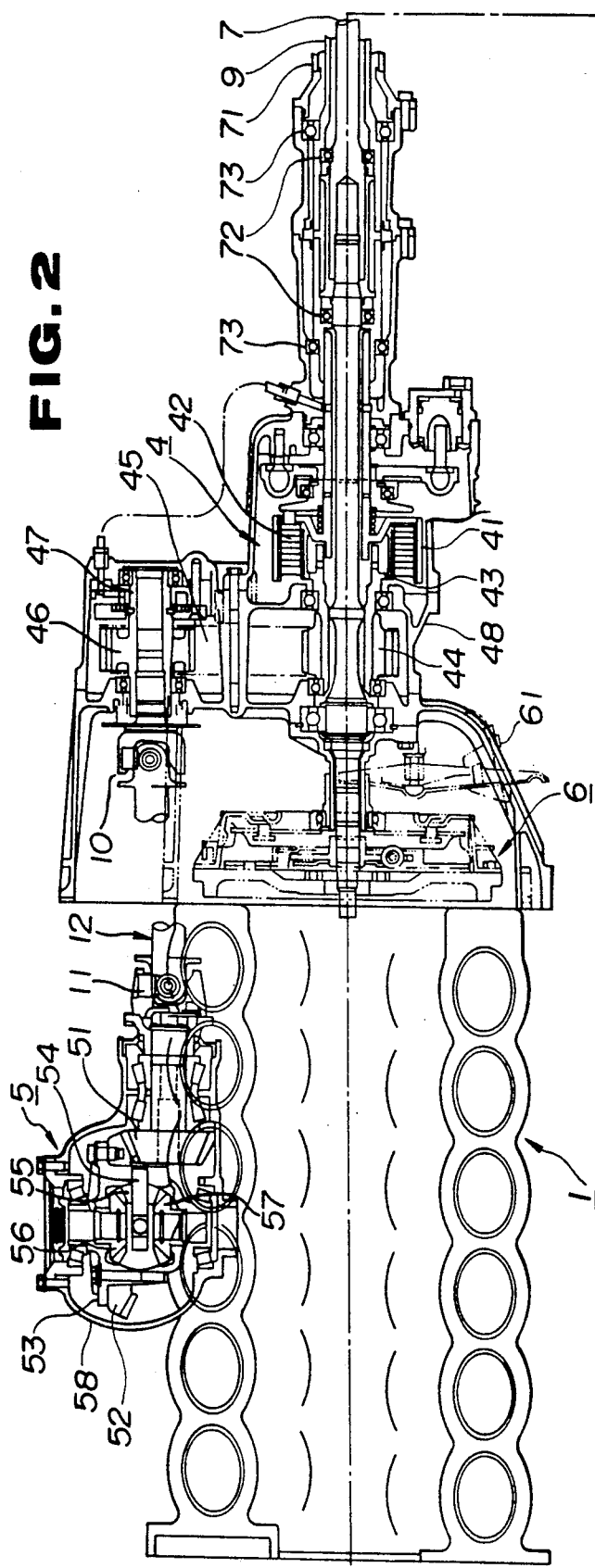

VEHICULAR FOUR WHEEL DRIVE TRAIN

This application is a continuation of application Ser. No. 07/652,078, filed Feb. 8, 1991 now abandoned.

BACKGROUND OF THE INVENTION

1. Field of the Invention

The present invention relates generally to an automotive four wheel drive train which includes a transfer gear via which engine drive output is distributed to the forward and rear wheels and more specifically to a four wheel drive train which enables the engine, clutch and transfer gear to be disposed at one end of the vehicle and the transmission to be located at the other end, and thus improves the vehicular weight distribution.

Description of the Prior Art

It is well known that in order to improve the overall handling characteristics of a vehicle it is advantageous to distribute the weight of the drive train evenly between the forward and rear axles.

One attempt to achieve the above mentioned type of weight distribution in a high performance vehicle has been to dispose the engine at the front of the vehicle, dispose the clutch, transmission and final drive (which are arranged in that order) at the rear, and interconnect the engine and the clutch with a propeller shaft which is housed in a torque tube.

While this has met with success in pure F-R type gear trains, adapting this concept to 4 WD type drive trains has encountered some difficulties in that it is necessary to add a transfer gear and to connect this with the front final drive.

A 4 WD arrangement of the above mentioned nature is disclosed in JP-A-62-247924. However, in this instance a number of drawbacks are encountered. That is to say, the propeller shaft which interconnects the transfer gear at the rear of the vehicle with the front final drive becomes excessively long. Further, the propeller shaft is offset to one side of the vehicle center line and thus tends to broaden the tunnel which ends through the vehicle cabin to an undesirable degree.

JP-A-61-157437 discloses another prior art four wheel drive train which is also based on an F-R drive arrangement. In this arrangement the engine, transmission, transfer and front final drive are disposed at the front of the vehicle, while the rear final drive is disposed at the rear of the same. The engine torque is transferred directly to the front wheels and to the rear wheels via a transfer clutch.

However, with this type of prior art four wheel drive train, as the engine, transmission, transfer and front final drive are disposed at the front of the vehicle chassis and only the rear transfer is disposed at the rear, the distribution of the weight with respect to the front and rear axles of the vehicle is such that a disproportionate amount is located near the front axle. As a result, the desired weight distribution is not achieved and the handling characteristics of the vehicle tend to be accordingly impaired.

Thus, as will be appreciated, in the case it is desired to adapt basic F-R or F-F type drive trains to provide 4WD, it is necessary to contrive a position for the transfer and the propeller shaft or shafts. For example, in the prior art when the transfer is connected to the transmission output shaft with normal techniques wherein the transfer is disposed toward the rear of the chassis, the propeller shaft which extends from the transfer to the front final drive must be extremely elongated and at the same time positioned not to interfere with the engine.

SUMMARY OF THE INVENTION

In view of the above problems it is an object of the present invention, in accordance with the problem solving means set forth below, to provide a four wheel drive power train the layout of which does not require a highly elongated propeller shaft, appropriately distributes the weight between the front and rear wheels, and in which interference between the propeller shaft and the engine does not occur.

In order to provide the above mentioned solution the four wheel drive train of the invention includes an engine, a transmission, a rear final drive and a front final drive.

In brief, the above object is ahieved by an arrangement wherein an engine and a first final drive are disposed proximate a first set of road wheels, while the transmission and a second final drive are disposed proximate the second set of road wheels. A torque tube, which operatively interconnects the engine containing section with the section in which the transmission is disposed, houses a first propeller shaft which transmits engine torque to the transmission, and a hollow second propeller shaft which is disposed coaxially about the first one, and which transmits torque back from the transmission to the engine containing section for application to the first set of road wheels.

More specifically, a first aspect of the present invention comes in the form of a four wheel vehicular drive train having an engine, a transmission, a rear final drive and a front final drive, and which is characterized in that the engine is disposed with one of the front and rear final drives and operatively connected therewith, and the transmission is disposed with and operatively connected with the other of the front and rear final drives; the engine is connected with the transmission by a first propeller shaft; the first propeller shaft and a second hollow propeller shaft which disposed coaxially with the first propeller shaft, each have one end connected to the transmission; and wherein: an intermediate power transfer section is disposed proximate the engine and operatively connected to the other end of the second propeller shaft, while the other final drive and the intermediate power transfer section are connected by a third propeller shaft.

A second aspect of the present invention comes in the form of a four wheel vehicular drive train which features: an engine having a crank shaft; a transmission having an input shaft and an output shaft; a first final drive disposed with and operatively connected with the output shaft of the transmission; a first propeller shaft having a first end in drive connection with an input shaft of the transmission and a second end which is operatively connected with a crankshaft of the engine through torque transmission means; a transfer gear having an input shaft and an output shaft; a second propeller shaft which establishes drive connection between the output shaft of the transmission and an input shaft of the transfer gear; and a third propeller shaft which establishes a drive connection between the output shaft of the transfer gear and a second final drive.

A further aspect of the present invention comes in the form of a four wheel drive train which features: a first unit which is disposed in drive connection with a first set of road wheels; an engine which is included in the first unit and which forms a part thereof; a second unit which is disposed in drive connection with a second set of road wheels; a transmission which is included in the second unit and which forms a part thereof; a first propeller shaft which transfers engine torque from the engine in the first unit to the transmission in the second unit, the second unit being arranged to transmit torque transmitted thereto through the first propeller shaft to the second set of road wheels; a second propeller shaft which transfers torque from the transmission in the second unit back to the first unit, the first unit being adapted to transmit the torque which is transferred through the second propeller shaft to the first set of driving wheels, the second propeller shaft being hollow and disposed about the first propeller shaft, the second propeller shaft being adapted to rotate in the same rotational direction as the first propeller shaft.

BRIEF DESCRIPTION OF THE DRAWINGS

FIG. 2 is a sectional plan view showing constructional details of a drive train of a first embodiment of the present invention which is configured in accordance with the layout shown in FIG. 1;

FIG. 3 is a sectional view taken along section line I—I of FIG. 2; and

DETAILED DESCRIPTION OF THE PREFERRED EMBODIMENTS

Figure 1:
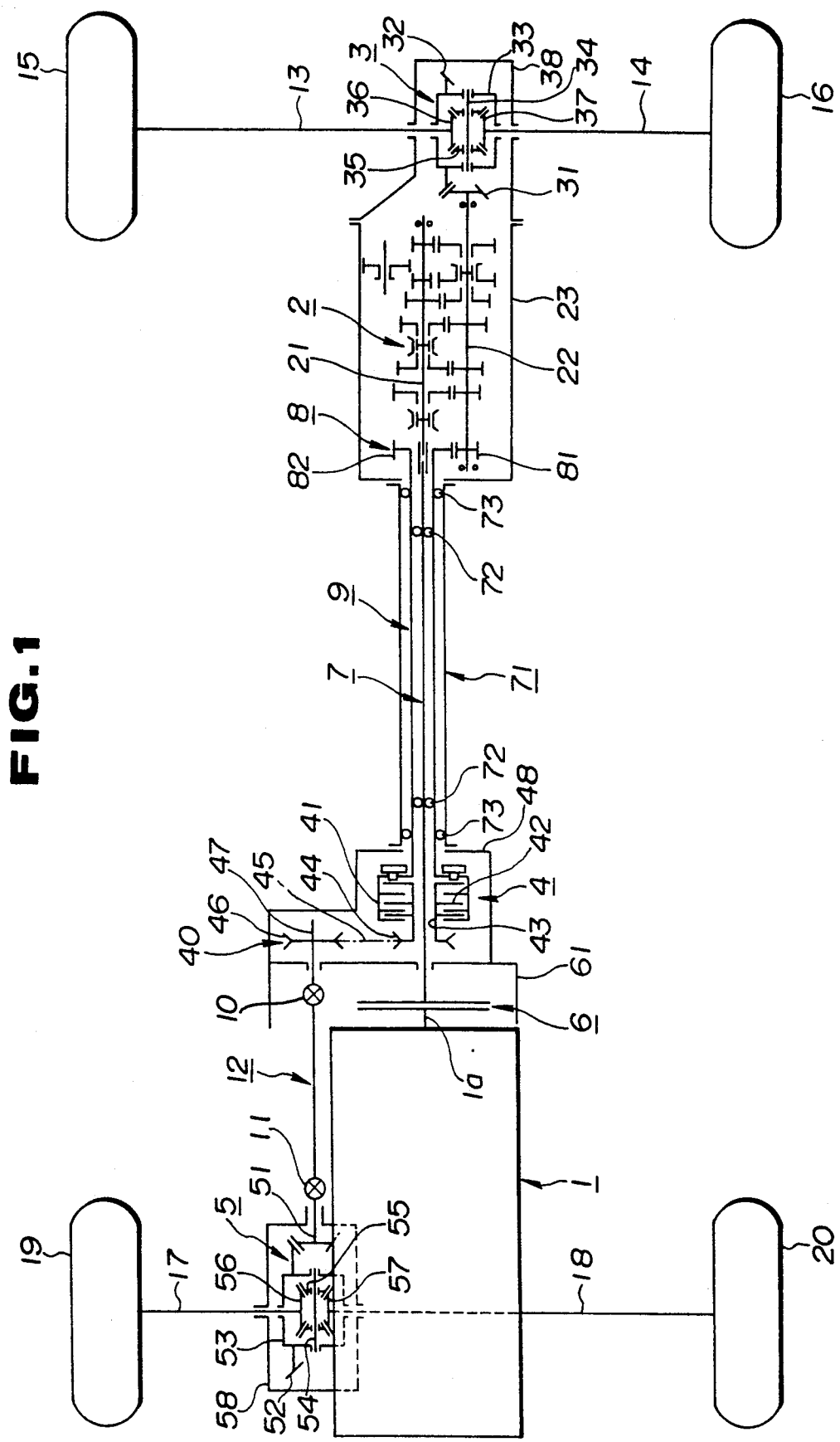
FIG. 1 is a schematic plan view showing the drive train layout which characterizes the present invention.

FIGS. 1 and 2 show the drive train skeleton and a sectional view an embodiment of a four wheel drive which includes a V-12 engine 1; a five forward speed, one reverse manual transmission 2; a rear final drive 3 which includes a differential gear; a transfer 4 which includes a variable torque split type clutch which is controlled by externally applied hydraulic pressure and which proportions the amount of drive power to the front wheels; and a front final drive 5 which includes a differential gear.

The engine 1, transfer gear 4, and front final drive 5 are disposed at one end of the vehicle. In this case it is assumed that this end is the front of the vehicle. However, it will be appreciated that the invention is not limited to forward engine type vehicles and an aft disposition is well within the scope of the present invention.

On the other hand, the manual transmission 2 and rear final drive 3 are disposed at the other end of the vehicle (viz., the rear of the vehicle).

The above mentioned engine 1 and the input shaft of the transmission 2 are connected by way of a clutch 6 and a first propeller shaft 7.

It should be noted that the clutch 6 is mounted on the rear end of the engine block and in direct connection with the crankshaft 1a of the engine 1.

The output shaft 22 of the transmission 2 and a clutch 41 of the transfer 4 are connected by way of a second output shaft construction which comprises meshing output and input gears 81 & 82, and a second hollow propeller shaft 9.

A driven element (clutch hub 43) of the transfer gear clutch 41 is connected with a first sprocket 44 for synchronous rotation therewith. A chain 45 connects the first sprocket with a second sprocket 46 which is mounted on the output shaft 47 of the transfer gear 4.

The sprockets and chain form part of a intermediate gearing 40.

Universal joints 10, 11 interconnect a third propeller shaft 12 with the output shaft 47 and a drive pinion 51 of the forward final drive 5.

A drive pinion 31 which forms part of the output section of the rear final drive 3, is formed integrally with one end of the transmission output shaft 22. Side gears 36, 37 and rear drive shafts 13, 14 establish a drive connection with the rear wheels 15, 16.

The transfer case 48 of the above mentioned transfer gear 4 and the transmission case 23 of the manual transmission 2, are connected by a torque tube 71. This torque tube 71 houses the first propeller shaft 7 and the coaxially arranged hollow second propeller shaft 9.

Further, as shown in FIG. 3 the above mentioned output and input gears 81, 82 are arranged to comprise a gearing 8 which establishes a drive connection between the output shaft 22 of the transmission and the second propeller shaft 9 and which drives the second propeller shaft 9 in the same rotational direction as that in which the first propeller shaft 7 is driven by the engine.

The first propeller shaft 7 is supported with the second propeller shaft 9 by way of ball bearings 72, and the latter is rotatably supported in the torque tube 71 by way of ball bearings 73.

It should be noted that the rear final case 38 is connected to the transmission case 23 to form a single housing. In a similar manner a clutch cover 61 is connected with the transfer case 48. A front final drive case 58 encloses the front final drive gear 5.

OPERATION

The engine drive power transmission which takes place with the clutch 6 fully engaged and with the manual transmission 2 set in a predetermined gear ratio position is such that power from the engine 1 goes from the engine crank shaft 1a→clutch 6→first propeller shaft 7 →transmission input shaft 21→transmission gears→the transmission output shaft 22, and distributed from the transmission output shaft 22 to the drive train of rear wheels 15, 16 and the drive train of the front wheels 19, 20.

The rear wheels 15, 16 are supplied with driving torque from the transmission output shaft 22 to the rear final drive 3 (rear drive pinion 31→ring gear 32→diff case 33→pinion shaft 34→pinion 35→side gears 36, 37)→rear drive shafts 13, 14.

Drive power is transmitted to the front wheels 19, 20 by way of the transmission output shaft 22→output gear 81→input gear 82→second propeller shaft 9→transfer 4 (clutch drum 41→clutch plate 42 →clutch hub 43)→central transfer hub)→first sprocket 44 of the →chain 45→second sprocket 46→output shaft 47)→universal joint 10→third propeller shaft 12→universal joint 11→front final drive 5 (front drive pinion 51→ring gear 52→diff case 53→pinion shaft 54→pinion 55→side gears 56, 57)→front drive shafts 17, 18.

The clutch engagement in the transfer gear 4 is controlled by an externally applied hydraulic pressure the level of which is controlled in accordance with the front/rear wheel rotational speed difference, the vehicle speed, accelerator depression degree, the lateral acceleration, etc.

It should be noted that when the transfer gear 4 assumes a fully engaged clutch condition, the front/rear wheel drive force distribution under four wheel drive conditions, becomes 1:1.

In accordance with the reduction of clutch engagement and the resulting controlled slip, the amount of torque which is distributed to the rear wheels with respect to that supplied to the forward ones is increased. Further, when the clutch of the transfer 4 assumes a fully released state, the torque distribution to the rear wheels becomes 100%.

In accordance with the above four wheel drive drive train the following advantages are achieved.

1) As the engine 1, transfer 4 and front final drive 5 are disposed at the front of the chassis, and the manual transmission 2, rear final drive 3 are disposed at the rear of the same, the weight distribution between the front and the rear of the vehicle tends to be unified and in a manner which promotes optimal vehicle handling characteristics.

2) The first propeller shaft 7 which interconnects the engine 1 and the manual transmission 2, the second propeller shaft which interconnects the manual transmission 2 and the transfer gear 4, and the third propeller shaft 12 which connects the transfer gear 4 and the forward final drive 5, are such as exhibit relatively small differences in length. Further, as the output shaft 47 of the transfer gear 4 is offset with respect to the coaxially arranged first and second propeller shafts 7, 9, the third propeller shaft 12 is displaced sideways sufficiently that interference with the engine is obviated.

3) As the first propeller shaft 7 is coaxially disposed within the hollow second propeller shaft 9, the arrangement becomes compact and eliminates the transfer of unreasonable amounts of torque. That is to say, as the first propeller shaft 7 is directly connected with the engine 1, the amount of torque which is transmitted by the second propeller shaft 9 is smaller in comparison. Viz., part of the torque which is supplied through the first propeller shaft 7 is transferred to the rear wheels whereby the remainder is transferred via the second propeller shaft 9. It will be noted that the amount of torque which is transferred from the output gear 81 to the second propeller shaft 9 is relatively high, the above mentioned construction is such that the second propeller shaft can adequately meet the torque transfer requirements while still remaining highly compact.

4) As the first propeller shaft is disposed coaxially within the hollow second one so as to be rotatable about a common axis of rotation o, the output gear 81 and the input gear 82 rotate in a manner to induce the two shafts 7, 9 to rotate in the same rotational direction, the first ball bearings 72 are well able to absorb the small rotational differences which tend to occur therebetween such as during the occurrence of wheel slip and the like, and there is chance of bearings undergoing excessive heating and/or permanent thermal damage. This of course markedly prolongs the life of the bearings.

It should be noted that if the first and second propeller shafts 7 and 9 were to be disposed so as to rotate in opposite rotational directions, the relative rotation would amount to the sum of the rotational speeds of the two shafts. Under prolonged high speed running the bearings would become abnormally heated and accordingly would tend to burn out or seize. Alternatively, in order to prevent this overheating a cooling system would be have to be specially provided.

5) The transfer case 48 of the transfer 4 and the transmission case 23 of the transmission 2 are connected by the torque tube 71, and the first and second propeller shafts 7, 9 are coaxially disposed therein and are are parallel with the center line of the vehicle, an increase in the width of the transmission tunnel in the vehicle cabin is eliminated. The circular shape of the torque tube 71 increase the compactness of the vehicle cabin tunnel improving cabin space.

6) As the rear drive pinion 31 is formed integrally at one end of the transmission output shaft 22 and the output gear 81 is connected to the other end, as compared with the case wherein the rear drive pinion 31 and the output gear are disposed as individual parts, the number of parts is decreased and the construction simplified to the degree that the transmission 2, the rear drive 3 and the gearing arrangement 8 can constructed and housed in the form of a single unit.

Figure 4:
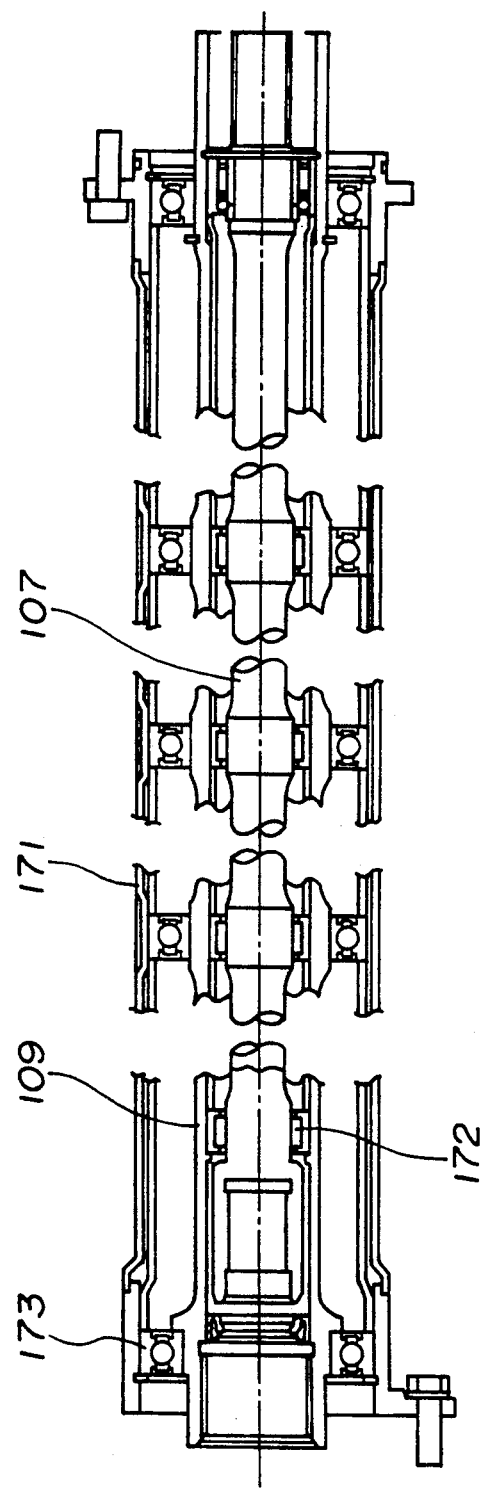
FIG. 4 is a sectional view showing a propeller shaft arrangement according to a second embodiment of the present invention.

FIG. 4 shows the construction which characterizes a second embodiment of the present invention. In this FIG. 107 denotes the first propeller shaft, 109 the second and 171 the torque tube in which the two propeller shafts are housed. In this embodiment needle bearings 172 are used in place of roller bearings between the two shafts. By using needle bearings it is possible to reduce the overall diameter of the propeller shaft and thus achieve a further saving in space. It should be noted that the use of needle bearings in place of the roller bearings 173 is also possible for the purpose of reducing the diameter of the torque tube.

It will be noted that the present invention is not necessarily limited to disclosed embodiments and various modifications can be made without departing from the scope of the present invention. By way of example, the manual transmission can be replaced with an automatic type transmission of the type shown in FIG. 1 of U.S. Pat. No. 4,628,754 issued on Dec. 16, 1986 in the name of Ideta et al or a stepless type wherein the shaft which is connected to output gear is capable of being extended and fitted with a gear similar to output gear 81.

Of course the use of torque converter or fluid coupling in place of the friction type clutch shown in FIG. 2 is also within the scope of the present invention.

The position of the clutch is not limited to disposition with the engine and may be grouped with the transmission if desired. This is so in the case of automatic transmissions wherein the pump which supplies the pressurized oil used for clutch engagement and the like, is often arranged within the torque converter.

The use of a viscous coupling, planetary gear or the like type of device in place of the hydraulically operated variable clutch in the transfer gear is also possible. The transfer gear clutch can be alternatively incorporated in the transmission.

What is claimed is:

1. A four wheel vehicular drive train comprising:
(a) an engine (1);
(b) a multi-speed transmission (2) having an input shaft (21) and output shaft (22);
(c) a rear final drive (3) operatively connected to the output shaft (22) of said transmission; and
(d) a front final drive (5) operatively connected to the output shaft (22) of said transmission;

wherein said engine (1) and one of said front and rear final drives (5,3) are disposed on one of a front part and rear part of a vehicle with respect to a center of the vehicle, and wherein said transmission (2) and the other of said front and rear final drives (5,3) are disposed on the other of said front and rear parts of the vehicle;

wherein a first propeller shaft (7) is provided having a first end in drive connection with the input shaft (21) of said transmission and a second end in drive connection with a crankshaft (1a) of said engine, and a second propeller shaft (9) is provided which is arranged coaxially with said first propeller shaft, a first end of said second propeller shaft being connected to the output shaft (22) of said transmission; and wherein a transfer (4) is arranged beside said engine (1) and is connected to a second end of said second propeller shaft (9), and a third propeller shaft (12) is connected between one of said front and rear final drives (5,3) and said transfer (4).

2. A four wheel vehicular drive train as set forth in claim 1, wherein at least two of said first, second, and third propeller shafts are similar in length.

3. A four wheel vehicular drive train as set forth in claim 2, wherein said first and second propeller shafts are operatively rotatable in the same rotational direction and wherein bearings (72, 73) are disposed between said first and second propeller shafts for manually supporting one another.

4. A four wheel vehicular drive train as set forth in claim 3, wherein a length of said third propeller shaft is relatively short.

5. A four wheel vehicular drive train as set forth in claim 4, further comprising front wheels (19, 20) and rear wheels (15, 16),
wherein said transfer (4) includes a variable torque split type clutch (41) which is controlled by externally applied hydraulic pressure and which proportions an amount of drive power to the front wheels.

6. A four wheel vehicular drive train as set forth in claim 5, which further includes a torque tube (71) which serves to connect a transfer case (48) of the transfer (4) and a transmission case (23) of the transmission (2), and which serves to house the first propeller shaft (7) and the coaxially arranged second propeller shaft (9), which is hollow.

7. A four wheel vehicular drive train as set forth in claim 6, wherein said bearings include ball bearings.

8. A four wheel vehicular drive train as set forth in claim 7, wherein a rear final case (38) is connected to a transmission case (23) to form a single housing.

9. A four wheel vehicular drive train as set forth in claim 1, wherein said engine (1) is remote from said transmission (2).

* * * * *